United States Patent Office 3,510,439
Patented May 5, 1970

3,510,439
STRUCTURAL ADHESIVES
Thomas F. Kaltenbach, Wayne, and Paul E. Wright, St. Clair Shores, Mich., assignors to General Motors Corporation, Detroit, Mich., a corporation of Delaware
No Drawing. Filed Dec. 1, 1967, Ser. No. 687,109
Int. Cl. C08g 45/12
U.S. Cl. 260—18                                6 Claims

ABSTRACT OF THE DISCLOSURE

A single or multipart adhesive formulation having an overall composition including a polyurethane prepolymer formed by the reaction between toluene diisocyanate and a polyalkylene ether or ester glycol and characterized by an isocyanate content of from 4–10%, a low molecular weight liquid epoxy resin, a solid primary diamine and the naphthenate, tallate or octoate salt of manganese, zinc, iron or lead may be rapidly cured by heating to a suitable temperature to form a strong humidity-resistant adhesive bond between members of metals, glass, rubber, synthetic resins and the like.

---

This invention relates to rapid curing high strength structural adhesives and more particularly to such a structural adhesive having exceptional resistance to an environment of high relative humidity. In a copending U.S. patent application, now abandoned, Ser. No. 471,262 filed July 12, 1965 and assigned to the assignee of this application, a novel rapid curing, high strength polyurethane-epoxy resin-solid diamine adhesive formulation was disclosed. Adhesive formulations in accordance with that disclosure have been used to bond together many different materials. While the strength of the bond might vary depending upon the materials being joined, the adhesive had utility in a wide variety of structural applications. For example, when the adhesive mixture was applied to the end portion of a surface of steel strips and the coated strips were suitably placed together and heated at 250° F. for five minutes, the formulation cured to produce a strong bond. Lap shear strength values of 3,000 to 5,000 p.s.i. were measured in accordance with ASTM–D–1002 Test Method-Strength Properties of Adhesives-Shear by Tension Loading. The cured adhesive was observed to maintain its excellent physical properties under normal atmospheric conditions for prolonged periods of time. However, under conditions of high relative humidity, as for example 100% relative humidity at 100° F., the bond is observed to slowly weaken.

It is an object of the present invention to provide an improved rapid curing high strength structural adhesive formulation employing a mixture of polyurethane and epoxy resins which resists degradation under conditions of high relative humidity.

It is a more specific object of the present invention to provide a polyurethane prepolymer-epoxy resin-primary diamine adhesive formulation wherein a small but effective amount of a suitable heavy metal salt is incorporated for the purpose of markedly improving the humidity resistance of the cured composition without significantly altering other properties.

In accordance with the invention these and other objects are accomplished by providing a one or multipart adhesive formulation of overall composition comprising, by weight, about 100 parts of a liquid polyurethane prepolymer, formed by the reaction between toluene diisocyanate and a polyalkylene ether glycol or polyalkylene ester glycol, the prepolymer being characterized by an isocyanate content of from about 4% to about 10%; 10–40 parts of a low molecular weight liquid glycidyl ether or polyglycidyl ether epoxide compound; from 8–50 parts of a solid primary diamine; and a small amount, up to about 3% by weight of the balance of the adhesive formulation, of a heavy metal salt taken from the group consisting of the naphthenate, tallate and octoate salts of iron, lead, zinc and manganese. The adhesive formulation may be employed as a multipart composition wherein the curing materials, the diamine and the heavy metal salts are maintained separately from the epoxy and urethane resins until a few minutes or hours before the adhesive is to be used. The separate parts are then uniformly mixed together and applied to a surface of the members to be joined. The members are assembled with the adhesive coated surfaces in juxtaposition and the assembly is heated to a temperature of about 150° F. to 350° F. for a brief time, usually three to sixty minutes depending upon the curing temperature. The strength of the adhesive bond will vary somewhat depending on the materials which are being joined. However, in general, the structural properties of the adhesive are considered to be excellent. For example, lap shear strength values of steel specimens bonded together employing the subject adhesive have been observed to be as great as about 5,000 p.s.i.

The subject invention also includes the employment of a solid latent diamine catalyst in finely divided powder form which is generally inert with respect to urethane and epoxy resins at room temperature but capable of curing these materials at elevated temperatures such as 150° F. to 350° F. With the availability of such a catalyst a one-part adhesive formulation (in accordance with the subject invention) can be prepared which will have an extended shelf life at room temperature. One suitable method of preparing a solid latent diamine curing agent is set forth in copending U.S. patent application Ser. No. 480,116 filed Aug. 16, 1965, also assigned to the assignee of this invention, and now U.S. Patent No. 3,375,299. In accordance with that disclosure finely divided solid diamine curing agent particles are treated with a suitable acid chloride to convert the active amine groups at or near the surface of the particle to nonreactive amide groups, the unaffected amine groups below the surface of the particle thereby being blocked off until the particle is heated to a suitable elevated curing temperature. When such a latent amine particle is employed, the urethane prepolymer, the liquid epoxy resin, the treated diamine and small but effective amounts of heavy metal salt up to about 3% by weight may all be incorporated into a one-part adhesive formulation.

The resins which are employed in the subject structural adhesive formulation are a mixture of polyurethane prepolymers and low molecular weight liquid diglycidyl ether epoxy compounds or polyglycidyl ether epoxy compounds. The urethane prepolymers which are used in this invention are commercially available reaction products of toluene diisocyanate and liquid polyalkylene ether glycols or liquid polyalkylene ester glycols in such a ratio as to obtain an excess of isocyanate groups. As is known in the prior art, polyalkylene ether glycols are substantially linear polymers formed by the reaction between alkylene oxides and alkylene glycols to form an ether linkage between the aliphatic portions. These compounds are terminated at each end by hydroxyl groups. Examples of suitable alkylene oxides are ethylene oxide and propylene oxide and examples of alkylene glycols are ethylene glycol, propylene glycol and butylene glycol. Prepolymers of varying molecular weights and viscosities may be obtained by selecting different polyalkylene ether glycols; for example, polyethylene ether glycol, polypropylene ether glycol or polybutylene ether glycol, and/or by controlling the time of polymerization of a given polyalkylene ether glycol.

Similarly substantially linear polyester glycols may be prepared by the reaction of an aliphatic dicarboxylic acid with an alkylene glycol. Examples of such dicarboxylic acids are malonic acid, succinic acid and adipic acid. The alkylene glycols include those mentioned above. Prepolymers formed from either polyether glycols or polyester glycols are suitable for use in this invention but the polyether glycol prepolymers are preferred because of their greater water resistance.

Toluene diisocyanates are obtainable as mixtures of the 2,4- and 2,6-isomers and as 100% 2,4-toluene diisocyanate. Both forms may be utilized in this invention but 2,4-toluene diisocyanate is preferred.

The preferred urethane prepolymers are the reaction products of 2,4-toluene diisocyanate and polybutylene ether glycol. The polybutylene ether glycol is reacted with the 2,4-toluene diisocyanate in such a molar ratio as to obtain a final product which has an excess of isocyanate groups. This resulting polyurethane which contains an excess of isocyanate groups is called a prepolymer.

Prepolymer isocyanate contents from about 4.0% to 10.0% are commercially available. However, those polymers having an isocyanate content in excess of about 9% by weight when used in the composition of this invention effected the strongest bond. Therefore, urethane prepolymers of the 2,4-toluene diisocyanate-polybutylene ether glycol type have an isocyanate content in excess of 9% are the preferred polyurethane embodiment of this invention.

Epoxy compounds which are useful are lower molecular weight liquid diepoxides and polyepoxides of the diglycidyl and the polyglycidyl ether type. The glycidyl ether group,

normally is formed by reacting epichlorohydrin with the appropriate glycol or phenol in the presence of sodium hydroxide. Examples of these epoxy compounds include the diglycidyl ether of bisphenol A (and is homologs), glycidyl ethers of glycerol, butanediol and other aliphatic polyhydric alcohols, diglycidyl ethers of resorcinol and other aromatic polyhydric alcohols, and polyglycidyl ethers of polynuclear, polyhydroxy phenols such as the novolac resins. Two particularly effective epoxies are resorcinol diglycidyl ether and butanediol diglycidyl ether. Only the low molecular weight liquid diepoxides and polyepoxides are preferred in formulations of this invention where a rapid curing is required. The rapid curing is effected by reaction of the isocyanate groups and epoxy groups with an amine and with the specified suitable heavy metal salts.

The specific curing components used in this invention effect a rapid cure of the urethane and epoxy resins to provide a strong adhesive bond which is resistant to high humidity conditions. These components include both a suitable solid primary diamine as well as a heavy metal salt taken from the group consisting of the naphthenate, tallate and octoate salts of manganese, zinc, lead and iron. These materials cooperate so as to allow sufficient time for preparation of the adhesive formulation and subsequent application thereof onto the surfaces of members to be joined before gelling to an unmanageable state. This is true even through a latent amine particle is not employed. With respect to the amines the employment of solid aliphatic and aromatic diamines and particularly bicyclic aromatic primary diamines is preferred. Liquid aliphatic diamines such as diethylenetriamine react so rapidly with the polyurethane and the epoxy resin that the adhesive gels before the curing agent can be thoroughly blended. However, bicyclic aromatic primary diamines such as 1,5-naphthalenediamine and orthotolidine have been found to be effective curing agents. Other diamines which have been found to be useful but less reactive than orthotolidine and 1,5-naphthalenediamine are 2,4,5,6-tetrachloro-m-xylene-α,α'-diamine, 2,4-toluene diamine, p,p' - methylene dianiline, 2,6 - diaminopyridine, orthophenylene diamine and meta-phenylene diamine and para-phenylene diamine.

In the curing of the urethane and epoxy compounds the use of approximately stoichiometric quantities of a diamine produces the highest bond strength. Such quantities are calculated assuming that the primary diamine will react with two isocyanate groups (bifunctional) and with four epoxy groups (tetrafunctional). It is not known whether the reaction proceeds precisely in this manner but the assumption provides a convenient and effective means for calculation. It is apparent however that the primary diamine reacts with both the isocyanate group and the epoxy group because adhesive strength is much lower if the epoxy compound is omitted.

An adhesive formulation consisting of suitable proportions of polyurethane prepolymer, epoxy resin and the solid primary diamine is capable of being cured as indicated to produce a strong bond. However, in accordance with the subject invention, when the adhesive bond is intended to be subjected to high humidity conditions the subject adhesive formulation is prepared to contain a small amount up to about 3% by weight of the urethane-epoxy-diamine components of a heavy metal salt taken from the group consisting of the naphthenate, tallate, and octoate salts of manganese, zinc, lead and iron. While up to 3% or more by weight of the heavy metal salt may be employed to increase the humidity resistance of the adhesive bond, particularly in multipart formulations, it is usually preferred tht less than about 1% by weight of the heavy metal salt be used. In general, this quantity will provide excellent humidity resistance in an adhesive bond and requires less of the relatively expensive heavy metal salt. The heavy metal naphthenate, tallate and octoate salts are commonly known as heavy metal soaps or driers. They are employed for many purposes in different industries. Perhaps they are most commonly known for their use in the drying of paint films. However, we have discovered that in the subject invention they may advantageously be employed to markedly improve the humidity resistance of a specific adhesive formulation. Of the heavy metal salts the naphthenate, tallate and octoate salts of manganese, zinc, lead and iron are considered suitable, alone or in combination, for use in the subject structural adhesive formulation to achieve the objects of the invention. It is preferred that this material be incorporated with the other components of the formulation without the use of any solvents or other diluents.

Thus, tthe novel composition of our adhesive includes approximately 100 parts by weight of a liquid polyurethane prepolymer, formed by the reaction between toluene diisocyanate and a suitable polyalkylene ether or ester glycol such as polybutylene ether glycol; 10–40 parts by weight of a low molecular weight liquid diepoxide or polyepoxide; 8–50 parts by weight of a solid aliphatic or aromatic primary diamine and a small amount up to about 3% of the total weight of the other three components (about 6 parts) of a heavy metal salt taken from the group consisting of the naphthenate, tallate and octoate salts of manganese, zinc, lead and iron. The polyurethane prepolymer is characterized by an isocyanate content from about 4% to 10%. This composition, upon curing at temperatures of 150° F. or higher, will result in a very strong bond between diverse materials which displays excellent resistance to conditions of high humidity.

The following specific examples of preferred embodiments of the subject invention clearly illustrate the use of a heavy metal salt, as defined above, in combination with the above three-component adhesive to produce strong humidity-resistant adhesive bonds.

Example I

Two substantially identical samples of an adhesive formulation were prepared each consisting of 29.5 grams of a liquid polyurethane prepolymer formed by the reaction between toluene diisocyanate and polybutylene ether glycol, 7 grams resorcinol diglycidyl ether and 13.5 grams tetrachloro-m-xylylene diamine. The polyurethane prepolymer was characterized by an isocyanate content of from about 9.2–9.5% by weight and a viscosity at 86° F. of from about 12,000–18,000 centipoises. The solid diamine curing agent in powder form had previously been rendered latent by treatment of the surface thereof with sebacyl chloride in accordance with the method described and claimed in Ser. No. 480,116, and subsequently sieved through a 200 mesh screen. The polyurethane prepolymer and epoxy resin were each degassed in vacuum prior to formulation. The weighed ingredients were combined by a simple mixing operation. Into one of the two formulations was thoroughly mixed 0.03 gram of lead napthenate. Both the lead- and nonlead-containing formulations were thoroughly degassed for fifteen minutes at 0.5 millimeter mercury absolute pressure. Then each of the two samples were used to prepare four separate tensile shear bonds. In preparation of each of the eight specimens adhesive was applied to the end portion of the surface of each of two 1″ x 4″ strips of steel to make ½″ lap shear joints. The coated portions of the two strips in each instance were pressed together and the adhesive was cured by heating the assembled strips at 250° F. for five minutes. Then the eight bonded assemblies were cooled. Two of the lead-containing adhesive bonded strips and two of the non-lead-containing strips were allowed to stand 72 hours at room temperature and their respective lap shear strengths were determined by the ASTM–D–1002 test method. The other two assemblies bearing lead in the adhesive as well as the other nonlead-containing adhesive assemblies were subjected to 100% relative humidity and 100° F. for 72 hours. The measured lap shear strengths are tabulated below:

|  | Tensile shear (p.s.i.) | |
|---|---|---|
|  | No heavy metal salt in adhesive | Lead naphthenate in adhesive (0.06% by wt.) |
| 72 hours room temp | 3,320 | 3,870 |
| Do | 3,110 | 3,530 |
| 72 hours humidity | 1,740 | 3,410 |
| Do | 1,930 | 3,160 |

It is observed that the lead naphthenate containing adhesive bond lost very little of its strength despite prolonged exposure to high humidity conditions while the shear strength of the nonlead-containing adhesive was substantially reduced.

Example II

Two samples of polyurethane prepolymer-liquid epoxy resin-latent solid primary diamine were prepared as in Example I. Into one of the portions was incorporated 0.03 gram (0.06% by weight) of lead naphthenate. The lead- and nonlead-containing formulations were employed to bond polymethyleneoxide strips (e.g. Du Pont's Delrin) to steel strips. The surfaces of the polymethyleneoxide strips were pretreated with p-toluene sulfonic acid, a process known as satinizing. The nonlead salt containing adhesive was applied to the end portion of a surface of three steel strips and three polymethyleneoxide strips and the coated portions of the polymethyleneoxide strips were respectively placed in juxtaposition with the coated portions of the steel strips. The procedure was repeated with the lead-containing adhesive and three additional steel strips and three additional polymethyleneoxide strips. The strip assemblies were heated for five minutes at 250° F. to cure the adhesive. The specimens were allowed to stand at room temperature for 72 hours and then subjected to 100% relative humidity at 100° F. for 72 hours. The specimens were subjected to lap shear strength determinations as in Example I and the results obtained are tabulated below:

|  | Tensile shear (p.s.i.) | |
|---|---|---|
|  | No heavy metal salt in adhesive | Lead naphthenate in adhesive (0.06% by wt.) |
| Delrin-steel 72 hours humidity | 1,070 / 1,250 / 1,720 | 2,050 / 1,840 / 2,260 |

In the above two examples the heavy metal salt was incorporated into the formulation substantially immediately prior to curing. However, when a latent diamine catalyst is employed in the overall adhesive composition it is preferable to also incorporate the heavy metal salt in the formulation so as to form a one-part adhesive having substantial shelf life. In this case a relatively small quantity of heavy metal drier should be employed to avert a detrimental affect on the shelf life of the system. For example, adhesive formulations substantially the same as those set forth in Examples I and II were prepared to which was added respectively 0.077 gram (0.15% by weight) and 0.75 gram (1.5% by weight) of the drier paste to determine the effect of this quantity of drier on the shelf life of the system. Both formulations gelled to an unworkable state within a 72 hour period. Additional samples were prepared as in Examples I and II containing 0.03 gram (0.06% by weight) and 0.015 gram (0.03% by weight) lead naphthenate. These materials had not set up after 72 hours and were subsequently employed to bond steel strips as above by heating the adhesive coated and assembled specimens at 250° F. for five minutes. The lap shear strength of the adhesive containing 0.15% lead was 3800 p.s.i., the lap shear strength of the specimen containing 0.03 gram lead drier was 3550 p.s.i. While quantities of heavy metal drier up to about 3% or more may be useful in two-part formulations which are to be mixed just before usage, it is preferred to maintain the metal salt content below about 0.1% by weight in one-part formulations which are expected to have a shelf life of 72 hours or longer.

In addition to the lead naphthenate, lead tallate, lead octoate and the naphthenates, tallates and octoates of iron, zinc and manganese have been successfully employed in adhesive formulations in the same general proportions as those set forth above. Each of these materials markedly increases the humidity resistance of the defined adhesive composition upon curing.

Example III

Three adhesive formulations were prepared as in Example I except that manganese naphthenate, iron naphthenate and zinc naphthenate respectively were employed as the metal salt component in the different adhesive mixes. The metal salt containing formulations were employed to bond steel strips together as in Example I. Four bonded strip assemblies were prepared with each of the three different metal drier containing formulations. The twelve specimens were allowed to stand 72 hours at room temperature. Six specimens, including two each of the three different formulations, were tested to determine the lap shear strength of the bonds. The other six specimens were subjected to 100% relative humidity and 100° F. for 72 hours. Lap shear strengths were also determined on these specimens. The following results were obtained:

|  | Tensile shear (p.s.i.) | | |
| --- | --- | --- | --- |
|  | Manganese naphthenate in adhesive (0.06% by wt.) | Iron naphthenate in adhesive (0.06% by wt.) | Zinc naphthenate in adhesive (0.06% by wt.) |
| 72 hours room temp | 3,000 | 3,520 | 3,150 |
| Do | 3,200 | 3,520 | 3,400 |
| 72 hours humidity | 3,000 | 2,900 | 3,040 |
| Do | 3,140 | 3,150 | 2,750 |

These heavy metal salts may also be added to a one-part formulation, containing a latent diamine catalyst, which has been standing for some time for the purpose of reactivating or revitalizing adhesion strength of the formulation. A three month old sample of adhesive identical to that described in Example I was found to give relatively low lap shear bond on steel strips of 2200 p.s.i. The addition of 0.3% by weight lead naphthenate to this formulation subsequently assisted in producing a bond strength between steel specimens of 3320 p.s.i.

While our invention has been described in terms of a few specific embodiments thereof, it will be appreciated that other forms might readily be adapted by those skilled in the art and accordingly the scope of the invention should be considered limited only by the following claims.

We claim:
1. In an adhesive formulation of overall composition comprising by weight about 100 parts of a liquid polyurethane prepolymer, formed by the reaction between a toluene diisocyanate and a polyglycol taken from the group consisting of a polyalkylene ether glycol and polyalkylene ester glycol, said prepolymer being characterized by an isocyanate content from about 4% to about 10%; 10–40 parts of a low molecular weight liquid glycidyl ether epoxide, said compound having more than one of said glycidyl ether groups per molecule; and from 8–50 parts of a solid primary diamine, a small but effective amount up to about 3% by weight of said adhesive formulation of a heavy metal salt taken from the group consisting of the naphthenate, tallate and octoate salts of lead, iron, manganese and zinc.

2. An adhesive formulation of overall composition consisting essentially of by weight about 100 parts of a liquid polyurethane prepolymer formed by the reaction between toluene diisocyanate and polybutylene ether glycol, said prepolymer characterized by an isocyanate content from about 4% to about 10% and a viscosity at 86° F. of from about 6,000 cps. to about 18,000 cps.; 10–40 parts of a low molecular weight liquid glycidyl ether epoxide compound, said compound having more than one of said glycidyl groups per molecule; 8–50 parts of a solid primary diamine and a small but effective amount up to about 6 parts of a heavy metal salt taken from the group consisting of the naphthenate, tallate and octoate salts of manganese, zinc, iron and lead, said composition upon curing resulting in a strong humidity-resistant metal-to-metal bond.

3. An adhesive composition as in claim 2 wherein said solid primary diamine is a solid bicyclic aromatic primary diamine.

4. An adhesive composition as in claim 2 wherein said low molecular weight liquid glycidyl ether epoxide compound is taken from the group consisting of resorcinol diglycidyl ether and butanediol diglycidyl ether.

5. An adhesive composition as in claim 2 wherein said solid primary diamine is taken from the group consisting of 1,5-naphthalene diamine, ortho-tolidine, and 2,4,5,6-tetrachloro-m-xylylene diamine.

6. A one-part adhesive formulation comprising by weight about 100 parts of a liquid polyurethane prepolymer, formed by the reaction between a toluene diisocyanate and a polyglycol taken from the group consisting of a polyalkylene ether glycol and polyalkylene ester glycol, said prepolymer being characterized by an isocyanate content from about 4% to about 10%; 10 to 40 parts of a low molecular weight liquid glycidyl ether epoxide, said compound having more than one of said glycidyl ether groups per molecule; from 8–50 parts of a particulate solid primary diamine and a small but effective amount up to about 0.2 part of a heavy metal salt taken from the group consisting of the naphthenate, tallate, and octoate salts of iron, lead, manganese and zinc; the amine groups in or near the surfaces of said diamine particles having been reacted with a carboxylic acid chloride whereby said amine groups are converted to amide groups and the active amine groups below the surface of the particle are blocked off and thereby prevented from reacting to cure said polyurethane prepolymer and said epoxide at room temperature, said one-part formulation being operative upon being heated to a temperature of about 150° F. to 350° F. to rapidly form a strong humidity-resistant adhesive bond.

References Cited

UNITED STATES PATENTS

| 3,426,097 | 2/1969 | Ilkka et al. | 260—77.5 X |
| --- | --- | --- | --- |
| 3,375,299 | 3/1968 | Levine et al. | 260—77.5 X |
| 3,316,220 | 4/1967 | Ramos | 260—77.5 |
| 3,309,261 | 3/1967 | Schiller et al. | 260—830 X |
| 3,158,586 | 11/1964 | Krause | 260—830 X |
| 3,267,050 | 8/1966 | Kuryla et al. | 260—77.5 X |
| 3,265,669 | 8/1966 | Hirosawa et al. | 260—77.5 |
| 3,136,731 | 6/1964 | Piechota | 260—75 X |
| 2,374,136 | 4/1945 | Rothrock | 260—77.5 X |

FOREIGN PATENTS 903,933  8/1962  Great Britain.

DONALD E. CZAJA, Primary Examiner

C. W. IVY, Assistant Examiner

U.S. Cl. X.R.

156—330, 331; 161—186, 190; 260—75, 77.5, 830